(12) United States Patent
Roberts et al.

(10) Patent No.: US 9,667,348 B1
(45) Date of Patent: May 30, 2017

(54) FREQUENCY DOMAIN COMBINATION OF PARALLEL SIGNAL PATHS

(75) Inventors: Kim B. Roberts, Ottawa (CA); Shahab Oveis Gharan, Ottawa (CA); William Martin Snelgrove, Toronto (CA); Mahmoud Taherzadehboroujeni, Kanata (CA)

(73) Assignee: Ciena Corporation, Hanover, MD (US)

( * ) Notice: Subject to any disclaimer, the term of this patent is extended or adjusted under 35 U.S.C. 154(b) by 963 days.

(21) Appl. No.: 13/495,630

(22) Filed: Jun. 13, 2012

(51) Int. Cl.
*H03K 9/00* (2006.01)
*H04B 10/60* (2013.01)
*H04L 27/00* (2006.01)
*H04L 25/00* (2006.01)

(52) U.S. Cl.
CPC .............. *H04B 10/60* (2013.01); *H04L 25/00* (2013.01); *H04L 27/00* (2013.01)

(58) Field of Classification Search
CPC ... H04B 1/00; H04B 3/00; H04B 7/00; H04B 14/00; H04B 17/00; H04B 2001/00; H04B 2201/00; H04J 13/00; H04J 2013/00; H03K 7/00; H03K 9/00; H03L 7/00; H04L 1/00; H04L 5/00; H04L 7/00; H04L 25/00; H04L 27/00; H04L 2001/00; H04L 2007/00; H04L 2025/00; H04L 2027/00; H03M 5/00
See application file for complete search history.

(56) References Cited

U.S. PATENT DOCUMENTS

| 7,701,842 B2 * | 4/2010 | Roberts et al. ............... 370/210 |
| 2010/0310256 A1 | 12/2010 | Shpantzer et al. |
| 2011/0142457 A1 | 6/2011 | Betty et al. |

OTHER PUBLICATIONS

J.K. Fischer, et al., "Digital Coherent Receiver Based on Parallel Optical Sampling" ECOC 2010, Sep. 19-23, 2010, Torino-Italy, IEEE, pp. 1-3.
Chao Zhang, et al., Demodulation of 1.28-Tbit/s Polarization-multiplexed 16-QAM Signals on a Single Carrier with Digital Coherent Receiver, OTuG3, 2009 OSA/OFC/NFOEC, 2009, IEEE, pp. 1-3.

* cited by examiner

*Primary Examiner* — Adolf Dsouza
(74) *Attorney, Agent, or Firm* — Integral Intellectual Property Inc.; Miriam Paton; Amy Scouten

(57) ABSTRACT

A receiver of an optical communications system includes a set of two or more analog-to digital A/D converters, a respective transform block connected to an output of each A/D converter, and a summation block. Each A/D converter samples a respective low-bandwidth analog signal comprising a respective portion of a high-bandwidth data signal. Each transform block calculates a set of spectral components of the respective low-bandwidth analog signal. The summation block combines respective spectral components calculated by each transform block to construct spectral terms of a combined signal having a spectrum corresponding to that of the high-bandwidth data signal.

12 Claims, 16 Drawing Sheets

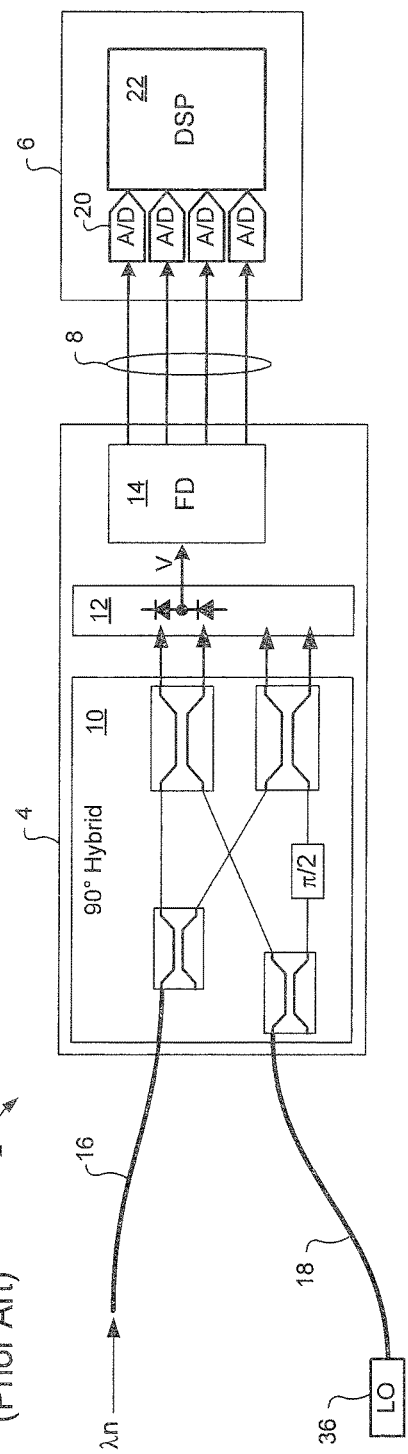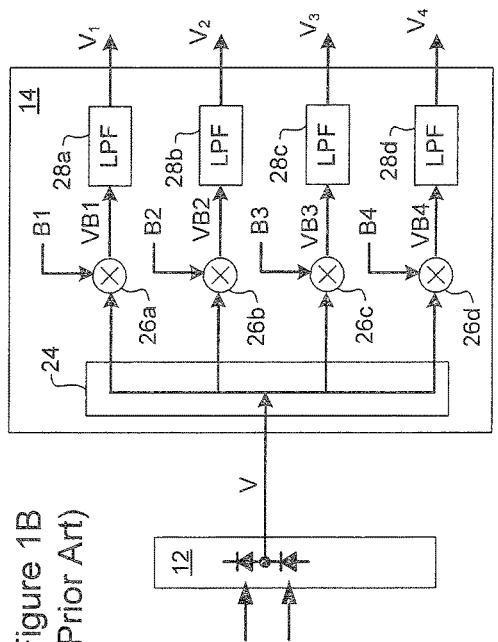
Figure 1A (Prior Art)
Figure 1B (Prior Art)

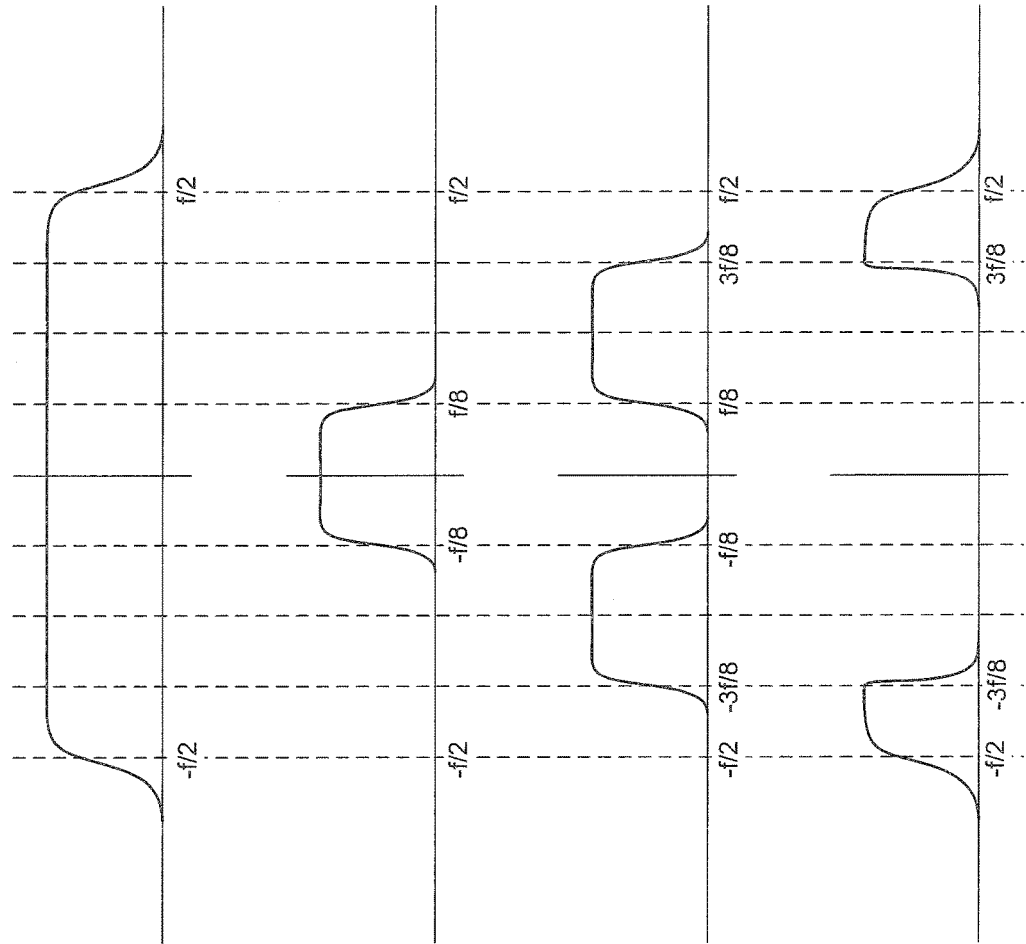

FREQUENCY DOMAIN COMBINATION OF PARALLEL SIGNAL PATHS

CROSS-REFERENCE TO RELATED APPLICATIONS

This is the first application filed in respect of the present invention

MICROFICHE APPENDIX

Not Applicable.

TECHNICAL FIELD

The present invention relates to communications networks, and in particular to frequency domain combination of parallel signal paths.

BACKGROUND

In this application, "Optical Communications Technologies" means optical switching, multiplexing transport, network management and access technologies for any format including WDM, packet, and carrier Ethernet as well as the services provided in support of or in connection therewith. Without limiting the generality of the forgoing, Optical Communications Technologies include all of Ciena's current products and services, all products and services currently under development, and all evolutions of such products and services.

Applicant's co-pending U.S. patent application Ser. No. 13/159,871, filed Jun. 14, 2011, the entire content of which is hereby incorporated herein by reference, teaches techniques for distributing a high-bandwidth analog signal to the front end of a multipath analog to digital converter. FIGS. 1A and 1B illustrate principle elements of a receiver module in accordance with U.S. patent application Ser. No. 13/159,871.

Referring to FIG. 1A, the receiver module 2 comprises an electro-optic IC 4 coupled to an electronic signal processor IC 6 via a parallel analog transmission line bus 8. The electro-optic IC 4 includes a 90° optical hybrid 10, a photodetector block 12, and an analog frequency decimation block 14. The optical hybrid 10 receives an incoming optical channel light and a local oscillator light through respective pigtails 16 and 18, and operates in a conventional manner to mix the two lights together to generate composite lights that are made incident on the photodetector block 12. Similarly, the photodetector block 12 operates in a conventional manner to generate an analog photodetector signal V that is proportional to the power of the incident composite light. The frequency decimation block 14 processes the photodetector signal to yield a set of parallel analog signals Vx (where x is an index value, x=1 ... N) which, when taken together, contain all of the information content modulated on the photodetector signal V; but which, taken individually, have a lower bandwidth than the photodetector current V. The electronic signal processor IC 6 comprises analog signal conditioning circuits (such as power amplifiers, filters etc., not shown) and analog-to-digital (A/D) converters 20 for converting the analog electrical signals Vx from the frequency decimation block 14 into raw digital sample streams which are processed by the DSP 22 to reconstruct the spectrum of the photodetector signal V and recover digital data signals modulated on the received optical channel signal As is known in the art, a conventional 90° optical hybrid is configured to mix the received optical channel light with the LO light and a 90° phase-shifted version of the LO light, to generate corresponding In-Phase and Quadrature composite lights for each of two polarizations of the incoming optical channel light. In many practical embodiments, it is desirable to provide respective parallel signal paths (each comprising a photodetector 12 and an analog frequency decimation block 14) for receiving and processing each of these composite lights. However, for simplicity of illustration, only the In-Phase signal path for a single polarization is shown in FIG. 1A, it being understood that the signal path(s) for the corresponding Quadrature composite light, and for the second polarization (if any), could be provided by suitably duplicating the elements of the In-Phase signal path.

Referring to FIG. 1B, a representative frequency decimation block 14 comprises an analog 1:N power splitter 24, which receives the photodetector current V, and outputs a set of N parallel duplicates of the photodetector current V in a known manner. In the illustrated embodiment, N=4, but this is not essential. Increasing the number N of outputs reduces the bandwidth performance requirements of the analog transmission line bus 8, at the cost of increased complexity. For enhanced performance the splitter 24 may contain filtering and or preamplification functions which, for simplicity of illustration, are not shown in the drawings. Each output of the 1:N splitter 24 is connected to a respective analog signal path, each of which includes a respective non-linear processor 26a-d cascaded with a low-pass filter (LPF) 28a-d. Each non-linear processor 26 applies a non-linear operation to the photodetector current V using a respective branch signal Bx to yield a composite signal VBx that is supplied the LPF 28. The LPF 28 operates in a conventional manner to attenuate undesired high-frequency components to yield a low bandwidth analog signal Vx, which can be transmitted through the analog transmission line bus 8 to the electronic signal processing IC 6.

The non-linear processors 26a-d can be designed to implement any suitable non-linear operation. For example, in the embodiment of FIGS. 1A-1B, the non-linear processor 26 is implemented as a conventional Radio Frequency (RF) mixer, which operates to combine the photodetector current V and the respective branch signal Bx in a known manner. In an embodiment in which the branch signals Bx are continuous wave sinusoidal signals, the non-linear function is the well known heterodyne or homodyne function. In embodiments in which the branch signals Bx are binary digital signals, the non-linear function approximates a switching or sampling function, depending on the duty cycle of the branch signals Bx. In either case, each parallel analog signal Vx (x=1 ... N) is an analog signal having a bandwidth determined by the respective LPF 28. After sampling these signals by the A/D converters 20, it is desired to recombine the signal paths in the DSP 22 to recover a digital representation of the original photodetector current V, which is sufficiently accurate that data modulated on the received channel light can be detected and recovered.

One method by which the signal paths may be recombined in the DSP 22 is to digitally process each signal, downstream of the A/D converters 20 so as to reverse the effects of the non-linear processors 26. For example, in a case where a given non-linear processor 26 implements a conventional down-conversion function, the corresponding digital signal may be digitally up-converted to offset this effect. The digital signals may then be filtered to remove undesired reflected images, and then combined using a digital summation process to yield a high-bandwidth digital signal corresponding to the original photodetector current V. A limitation of this approach is that it may significantly increase the size and cost of the DSP 22.

Techniques that overcome limitations of the prior art remain highly desirable.

SUMMARY

A receiver of an optical communications system includes a set of two or more analog-to digital A/D converters, a respective transform block connected to an output of each A/D converter, and a summation block. Each A/D converter samples a respective low-bandwidth analog signal comprising a respective portion of a high-bandwidth data signal. Each transform block calculates a set of spectral components of the respective low-bandwidth analog signal. The summation block combines respective spectral components calculated by each transform block to construct spectral terms of a combined signal having a spectrum corresponding to that of the high-bandwidth data signal.

BRIEF DESCRIPTION OF THE DRAWINGS

Further features and advantages of the present invention will become apparent from the following detailed description, taken in combination with the appended drawings, in which:

FIGS. 1a and 1b are block diagrams schematically illustrating a receiver module known from U.S. patent application Ser. No. 13/159,871;

FIGS. 6A-6D are spectral diagrams illustrating operation of the frequency decimation block of FIG. 5;

It will be noted that throughout the appended drawings, like features are identified by like reference numerals.

DETAILED DESCRIPTION

In the following description, techniques in accordance with the present invention are described by way of representative embodiments which are particularly suited for use in optical communications systems. However, it will be appreciated that the techniques described herein are equally applicable to other fields of technology. More generally, techniques in accordance with the present invention may be utilised in any context in which a high-band-width signal has been frequency-divided into a set of parallel signals of lower bandwidth, and it is desired to recombine these signals to recover a high bandwidth signal having a spectrum corresponding with that of the original high-bandwidth signal. In this context, it will be appreciated that it is not necessary for the spectrum of the reconstructed signal to an exact (or high-fidelity) reproduction of the spectrum of the original high-bandwidth signal. Rather it is sufficient that the spectrum of the reconstructed signal is a close-enough reproduction of the original high-bandwidth signal spectrum to enable successful recovery of data modulated on the high-bandwidth signal.

Figure 2:
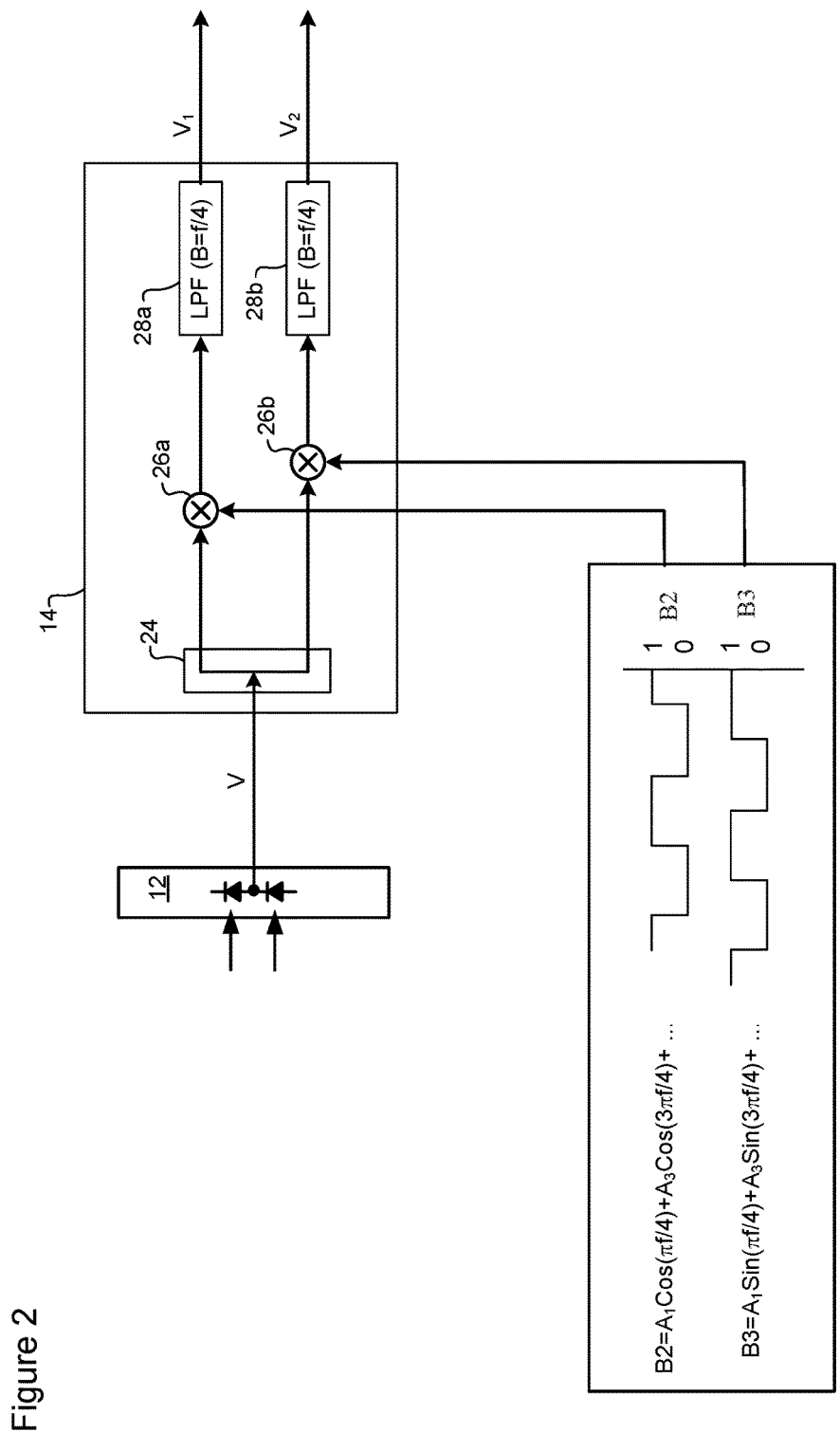
FIG. 2 is a block diagram schematically illustrating operation of a frequency decimation block having two output channels.

Referring to FIG. 2, there is shown a frequency decimation block 14 which operates to divide the input analog signal V into a pair of lower bandwidth channel signals V1 and V2. FIGS. 3A-3C illustrate an embodiment in which the spectrum of the amplified input analog signal V spans a frequency range between −f/2 and +f/2, as may be seen in FIG. 3A.

In the embodiment of FIGS. 2 and 3A-3C, the input analog signal V is supplied to a parallel pair of non-linear processors 26a and 26b, each of which is supplied with a respective branch signal B2 and B3. The non-linear processors 26a and 26b may, for example, be provided as analog mixers, digital samplers, or high frequency switches. These branch signals B2, B3 have a common frequency (f/4 in the illustrated example) and a phase offset of 90° relative to each other. Low pass filtering (at 28a and 28b) the composite signals output from each of the non-linear processors 26a and 26b yields a pair of analog signals V1 and V2, each of which has a spectrum centered on 0 Hz (baseband) and a bandwidth of B=f/4 determined by the LPFs 28a and 28b, as may be seen in FIGS. 3B and 3C.

As may be appreciated, the use of digital branch signals B2-B4 is beneficial in that it enables accurate control of the frequency and phase relationships between the branch signals, and allows the use of switches as non-linear processors 26. This, in turn, enables the generation of parallel analog signals V1 and V2 which, when taken together, contain all of the information content modulated on the photodetector signal V; but which, taken individually, have a lower bandwidth than the photodetector current V.

Figure 3:
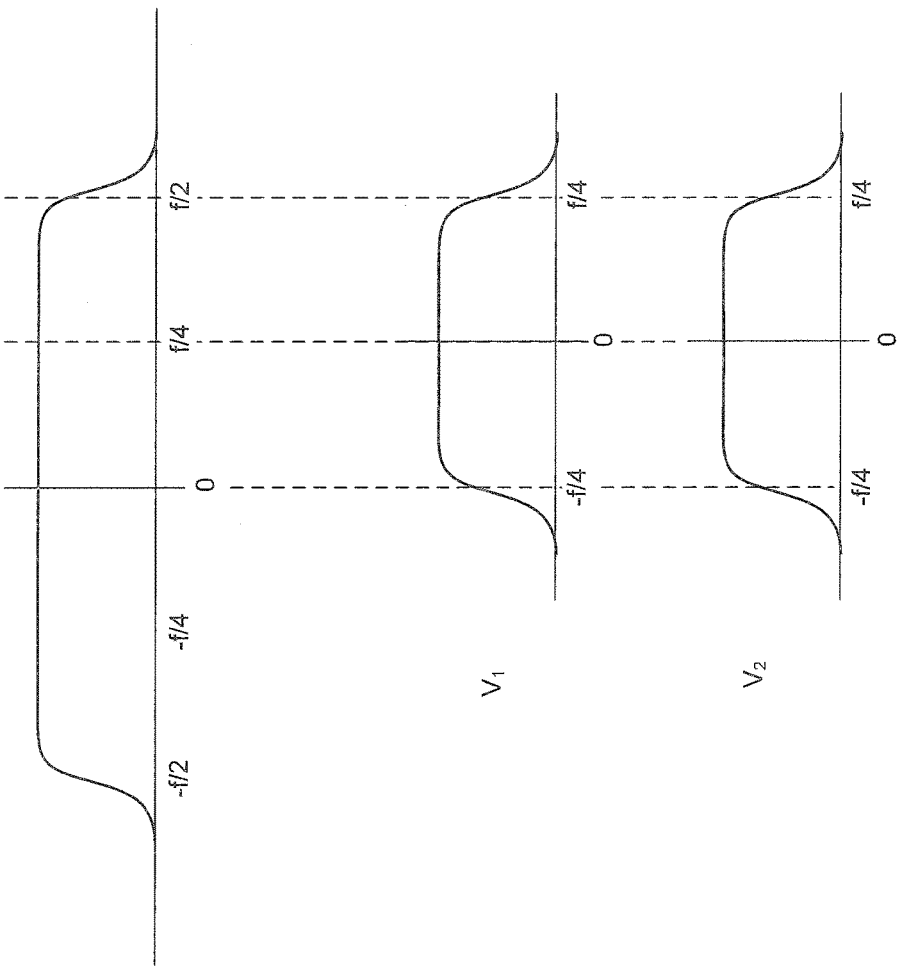
FIGS. 3A-3C are spectral diagrams illustrating operation of the frequency decimation block of FIG. 2.
Figure 4:
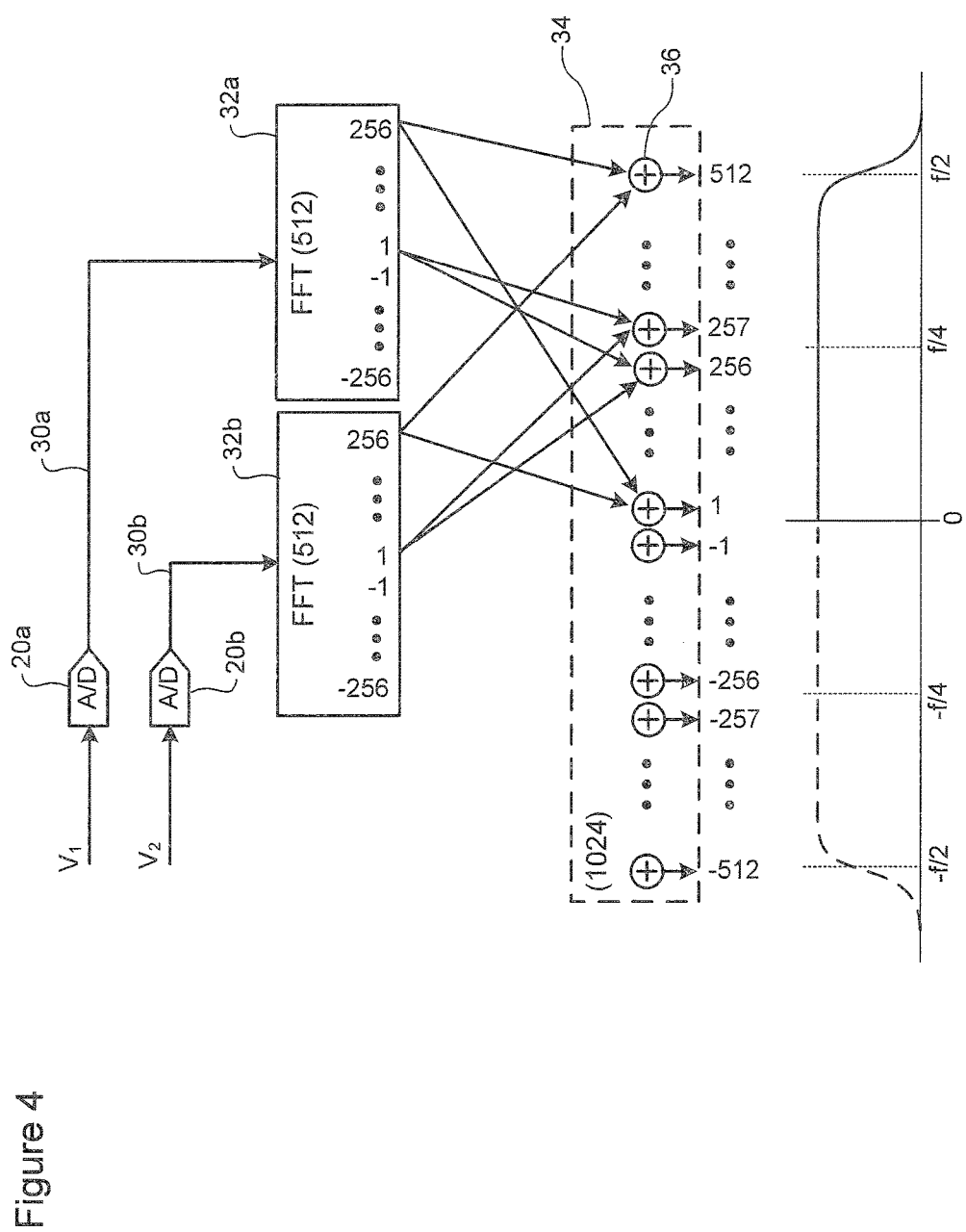
FIG. 4 is a block diagram schematically illustrating operation of a frequency domain signal combiner usable in conjunction with the frequency decimation block of FIGS. 2 and 3.

Referring to FIG. 4, a technique is illustrated for digitally recombining the parallel analog signals V1 and V2 in the DSP 22 to recover a digital representation of the original photodetector current V. In the illustrated embodiment, the parallel analog signals V1 and V2 are sampled by respective A/D converters 20a and 20b, and the corresponding sample steams 30a and 30b processed by respective Fast Fourier Transform (FFT) blocks 32a and 32b. Each FFT block 32 has a width of 512 taps, which, for convenience, are labelled as −256 . . . −1, 1 . . . 256. This labelling convention is useful in that the spectrum of each of the analog signals V1 and V2 is centered on 0 Hz (as shown in FIG. 3) so that taps 1 . . . 256 of each FFT block 32 will correspond with positive frequency components of the input signal Vx, and taps −1 . . . −256 will correspond with negative frequency components of the input signal Vx (or, equivalently, the conjugate of taps 1 . . . 256). With this arrangement, the two sample streams 30a-b can be combined using a 1024-tap summation block 34 to construct a digital spectrum that closely approximates the spectrum of the photodetector current V. With this arrangement, frequencies −f/4 and f/4 of the combined signal are bracketed by taps (−257, −256) and 256, 257, respectively, of the summation block 34.

As may be seen in FIG. 4, each tap of the summation block 34 comprises a digital adder 36 connected to calculate the sum of one tap from each FF7 32. For ease of illustration, connections are shown for constructing the positive frequency components of the combined signal, it being understood that the negative frequency components will be constructed in a directly analogous manner. For the positive frequency components, each tap (i) of the combined signal (VF) is constructed as follows:

For frequency components from f/4 to f/2: VF(256+i)=V1(i)+V2(i) i=1 . . . 256,

For frequency components from f/4 to 0: VF(257−i)=V1(i)+V2(i) i=1 . . . 256,

The negative frequency components are constructed in a corresponding manner. Thus, each tap (i) of the combined signal (VF) is constructed as follows:

For frequency components from −f/4 to −f/2: VF(256+i)=V1(i)+V2(i) i=−1 . . . −256, For frequency components from −f/4 to 0: VF(257−i)=V1(i)+V2(i) i=−1 . . . −256, Referring to FIG. 5, there is shown a frequency decimation block 14 which includes a preamplifier 38 cascaded with a frequency domain divider 40. The preamplifier 38 operates to amplify the analog signal V output from the photodetector block 12, and the frequency domain divider 40 divides the amplified photodetector signal 42 to produce a set of parallel frequency band signals 44. In the illustrated embodiment, the frequency-domain divider 40 is provided as a triplexer configured to divide the amplified analog signal 42 into a set of three predetermined frequency band signals, namely: a low frequency band signal 44L; a mid-frequency band signal 44M; and a high frequency band signal 44H. FIGS. 6A-6D illustrate an embodiment in which the spectrum of the amplified analog signal 42 spans a frequency range between −f/2 and +f/2, as may be seen in FIG. 6A. In the illustrated embodiment, the frequency-domain divider 40 operates to divide the amplified analog signal into a low frequency band signal 44L encompassing frequencies lying below +f/8 as may be seen in FIG. 6B; a mid-frequency band signal 44M encompassing frequencies between f/8 and 3f/8 as may be seen in FIG. 6C; and a high frequency band signal 44H encompassing frequencies lying above 3f/8 as may be seen in FIG. 6D. Other frequency ranges may be used, if desired.

Figure 5:
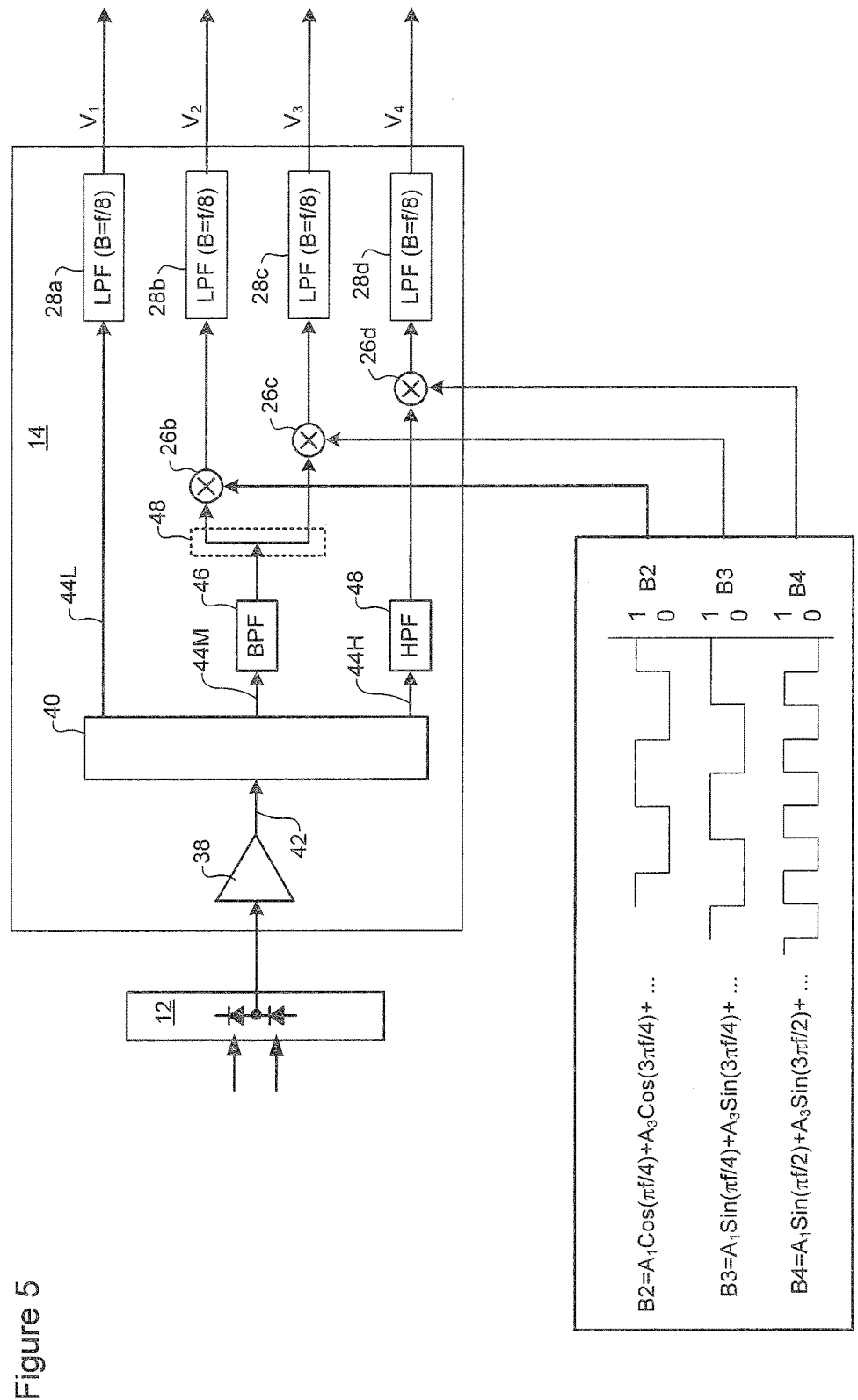
FIG. 5 is a block diagram schematically illustrating operation of a frequency decimation block having four output channels.

In the embodiments of FIGS. 5 and 6, the low frequency band signal 44L is a baseband signal. This implies that a nonlinear processor 26a (FIG. 1B) in the low frequency band signal path would receive a DC branch signal B1, which has no effect and thus can be omitted. Low-pass filtering the low frequency band signal 44L (at 28a) yields a low-frequency analog signal V1 which can be sampled by A/D converter 20a and processed by the DSP 22 to recover low-frequency components of the photodetector signal V. On the other hand, the mid-frequency band signal 44M is preferably filtered by a band pass filter 46, and then supplied to a divider 48 connected to a parallel pair of non-linear processors 26b and 26c, each of which is supplied with a respective mid-frequency branch signal B2 and B3. These mid-frequency branch signals B2, B3 have a common frequency (f/4 in the illustrated example) and a phase offset of 90° relative to each other. Low pass filtering (at 28b and 28c) the composite signals output from each of the non-linear processors 26b and 26c yields a pair of low-frequency analog signals V2 and V3 which can be sampled by A/D converters 20b and 20c and processed by the DSP 22 to recover mid-frequency components of the photodetector signal V. Similarly, the high-frequency band signal 44H is preferably filtered by a high pass filter 48, and then supplied to a non-linear processor 26d which is supplied with a respective high-frequency branch signal B4 (having a frequency of f/2 in the illustrated example). Low pass filtering (at 28d) the output of the non-linear processor 26d yields a low frequency analog signal V4 which can be sampled by A/D converters 20d and processed by the DSP 22 to recover high-frequency components of the photodetector signal V.

Figure 7A:
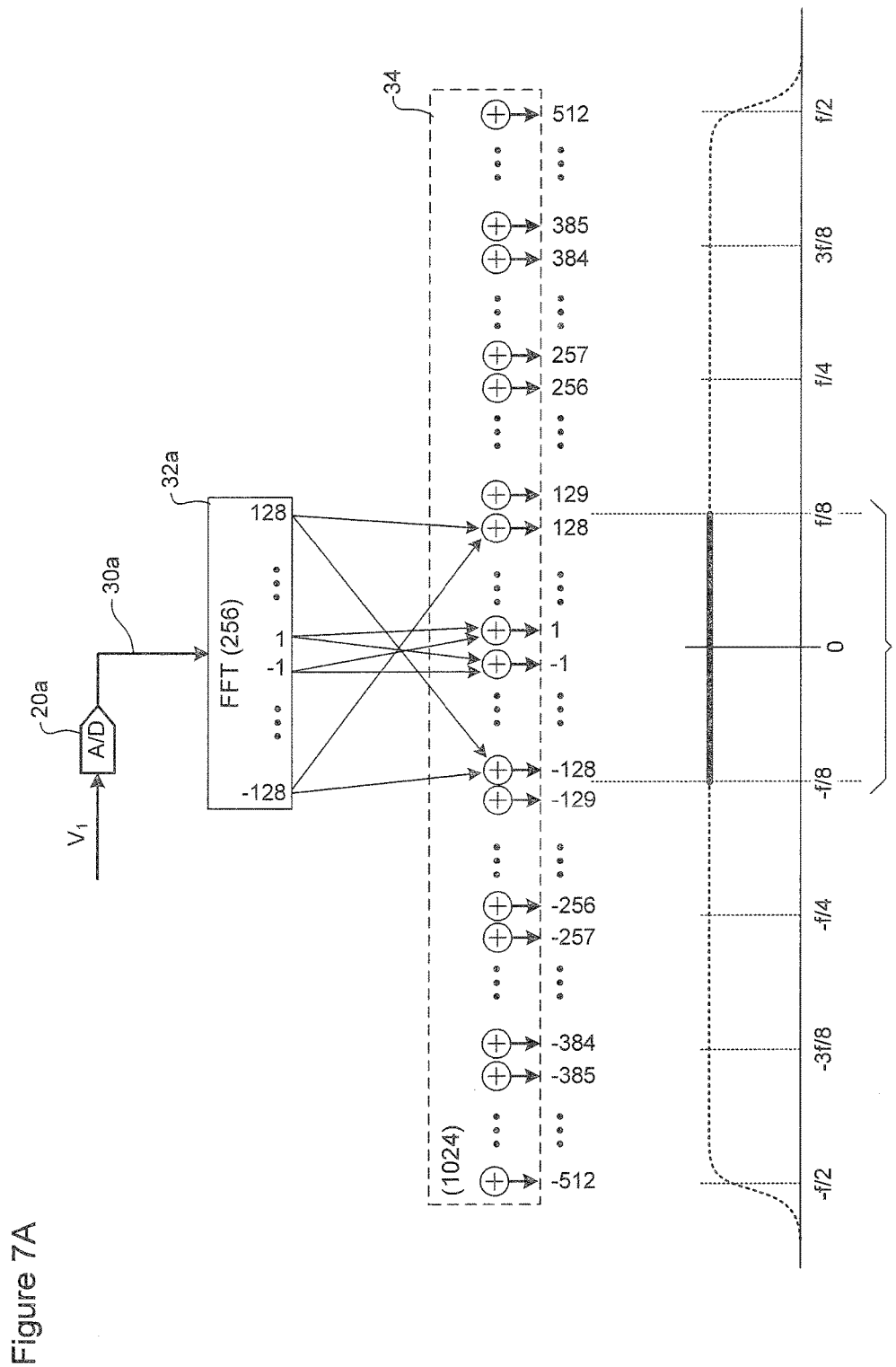
FIGS. 7A-7C are block diagrams schematically illustrating operation of a frequency domain signal combiner usable in conjunction with the frequency decimation block of FIG. 5.
Figure 7B:
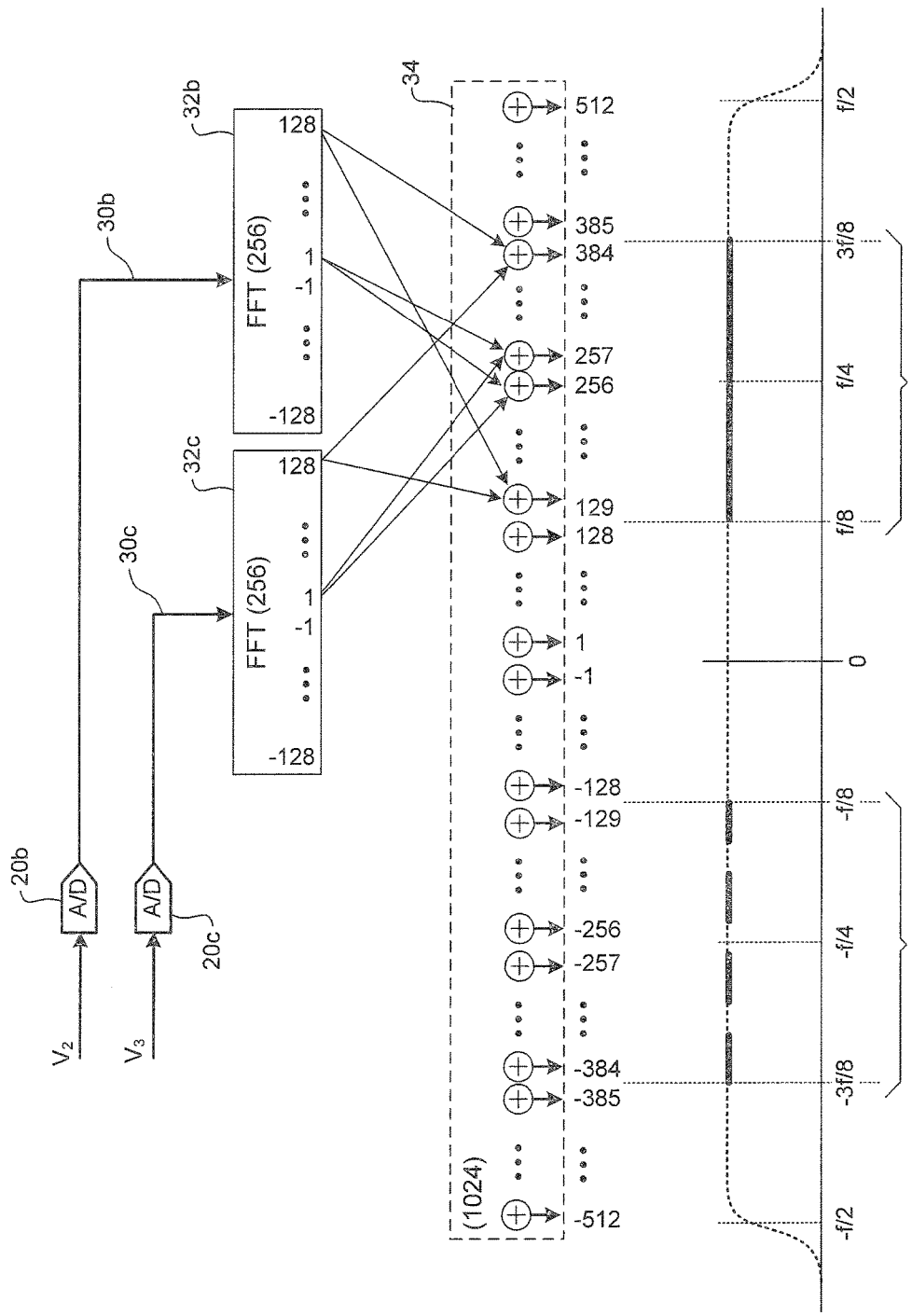
Figure 7C:
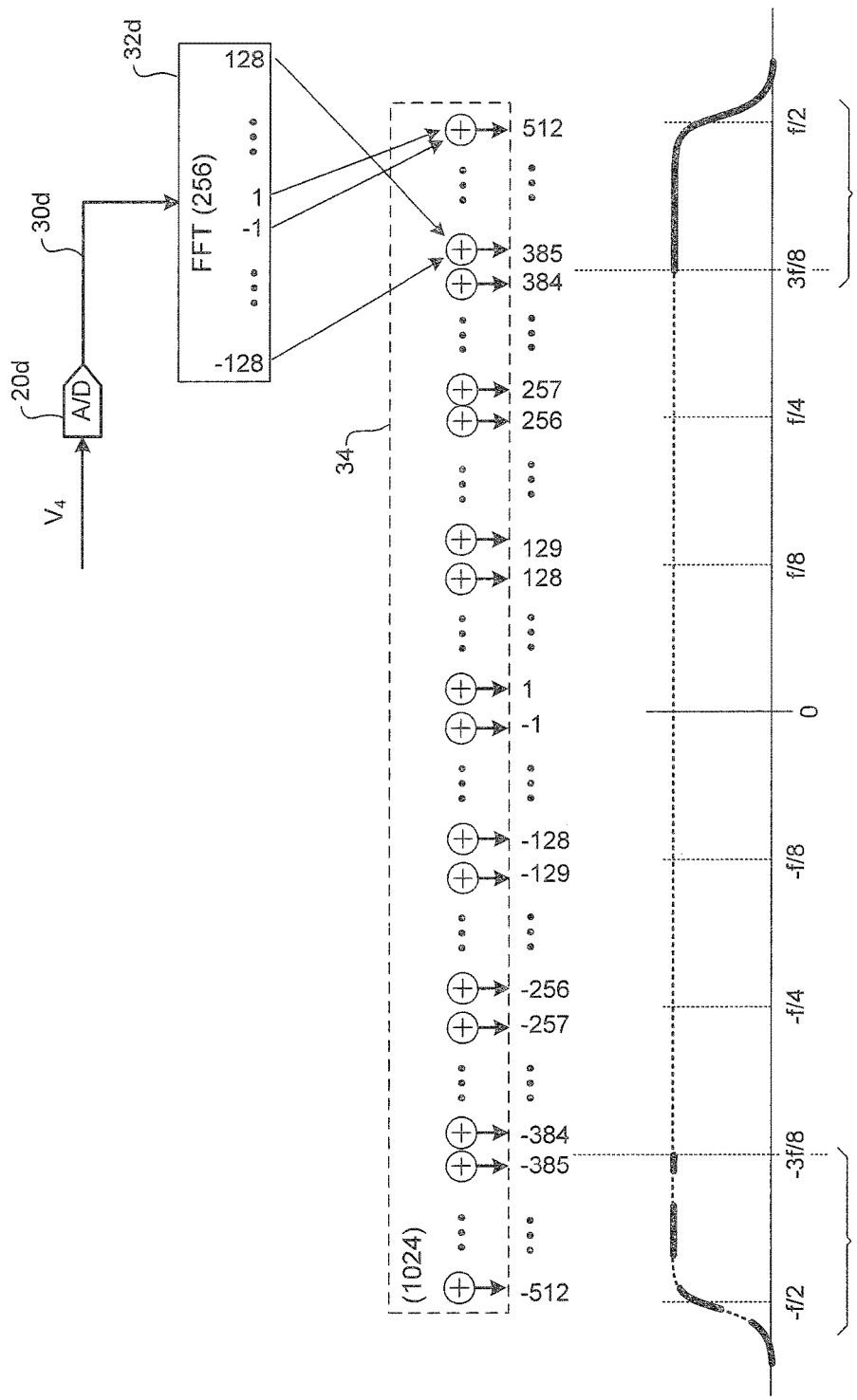

Referring to FIGS. 7A-7C, a technique is illustrated for digitally recombining the parallel analog signals V1-V4 in the DSP 22 to recover a digital representation of the original photodetector current V. As in the embodiment of FIG. 4, each analog signal is sampled by a respective A/D converter 20 and then processed by a respective FT block 32. The output taps of each FFT block are then combined by a summation block 34 to construct a digital spectrum that closely approximates the spectrum of the photodetector current V. For ease of illustration, the construction of the low-frequency, mid-frequency, and high-frequency components of the combined sign (VF) are illustrated separately.

FIG. 7A illustrates construction of the low-frequency components of the combined sign (VF). As may be seen in FIG. 7A, the low frequency analog signal V1 is sampled by A/D converter 20a, and the corresponding sample steam 30a is processed by a Fast Fourier Transform (FFT) block 32a. The FFT block 32a has a width of 256 taps, which, for convenience, are labelled as −128 . . . −1, 1 . . . 128. This labelling convention is useful in that the spectrum of the analog signal V1 is centered on 0 Hz (as shown in FIG. 6B) so that taps 1 . . . 128 of FFT block 32a will correspond with positive frequency components of the input signal V1, and taps −1 . . . −128 will correspond with negative frequency components of the input signal V1 (or, equivalently, the conjugate of taps 1 . . . 128). With this arrangement, the sample stream 30a can be combined in the center 256 taps of the 1024-tap summation block 34 to construct the low-frequency components of a digital spectrum that closely approximates that of the photodetector current V.

For the positive frequency components, each tap (i) of the combined signal (VF) is constructed as follows:

For frequency components from 0 to f/8: VF(i)=V1(i)+V1(−i) i=1 . . . 128,

The negative frequency components are constructed in a corresponding manner. Thus, each tap (i) of the combined signal (VF) is constructed as follows:

For frequency components from 0 to −f/8: VF(i)=V1(i)+V1(−i) i=−1 . . . −128,

FIG. 7B illustrates construction of the mid-frequency components of the combined sign (VF). As may be seen in FIG. 7B, the mid frequency band analog signals V2 and V3 are sampled by respective A/D converters 20b and 20c, and the corresponding sample steams 30b and 30c processed by respective Fast Fourier Transform (FFT) blocks 32b and 32c. Each FFT block 32 has a width of 256 taps, which, for convenience, are labelled as −128 . . . −1, 1 . . . 128. This labelling convention is useful in that the spectrum of each of the analog signals V1 and V2 is centered on 0 Hz so that taps 1 . . . 128 of each FFT block 32 will correspond with positive frequency components of the input signal Vx, and taps −1 . . . −128 will correspond with negative frequency components of the input signal Vx (or, equivalently, the conjugate of taps 1 . . . 128). With this arrangement, the two sample streams 30b-c can be combined using 1024-tap summation block 34 to construct the mid-frequency band components of a digital spectrum that closely approximates that of the photodetector current V. With this arrangement, frequencies −f/4 and f/4 of the combined signal are bracketed by taps (−257, −256) and 256, 257, respectively, of the summation block 34.

For the positive frequency components, each tap (i) of the combined signal (VF) is constructed as follows:

For frequency components from f/4 to 3f/8: VF(256+i)=V2(i)+V2(i) i=1 ... 128,

For frequency components from f/4 to f/8: VF(257−i)=V2(i)+V3(i) i=1 ... 128,

The corresponding negative frequency components are constructed in a similar manner. Thus, each tap (i) of the combined signal (VF) is constructed as follows:

For frequency components from −f/4 to −3f/8: VF(256+i)=V2(i)+V3(i) i=−1 ... −128, For frequency components from −f/4 to f/8: VF(257−i)=V2(i)+V3(i) i=−1 ... −128, FIG. 7C illustrates construction of the high-frequency components of the combined sign (VF). As may be seen in FIG. 7C, the high frequency analog signal V4 is sampled by A/D converter 20d, and the corresponding sample steam 30d is processed by a Fast Fourier Transform (FFT) block 32d. The FFT block 32d has a width of 256 taps, which, for convenience, are labelled as −128 ... −1, 1 ... 128. This labelling convention is useful in that the spectrum of the analog signal V4 is centered on 0 Hz so that taps 1 ... 128 of FFT block 32d will correspond with positive frequency components of the input signal V4, and taps −1 ... −128 will correspond with negative frequency components of the input signal V4 (or, equivalently, the conjugate of taps 1 ... 128). With this arrangement, the sample stream 30d can be combined in the upper-most and lower-most 128 taps of the 1024-tap summation block 34 to construct the high-frequency components of a digital spectrum that closely approximates that of the photodetector current V.

For the positive frequency components, each tap (i) of the combined signal (VF) is constructed as follows:

For frequency components from 3f/8 to f/2: VF(513−i)=V1(i)+V1(−i) i=1 ... 128,

The negative frequency components are constructed in a corresponding manner. Thus, each tap (i) of the combined signal (VF) is constructed as follows:

For frequency components from −3f/8 to −f/2: VF(−513+i)=V1(i)+V1(−i) i=1 ... 128.

Figure 8:
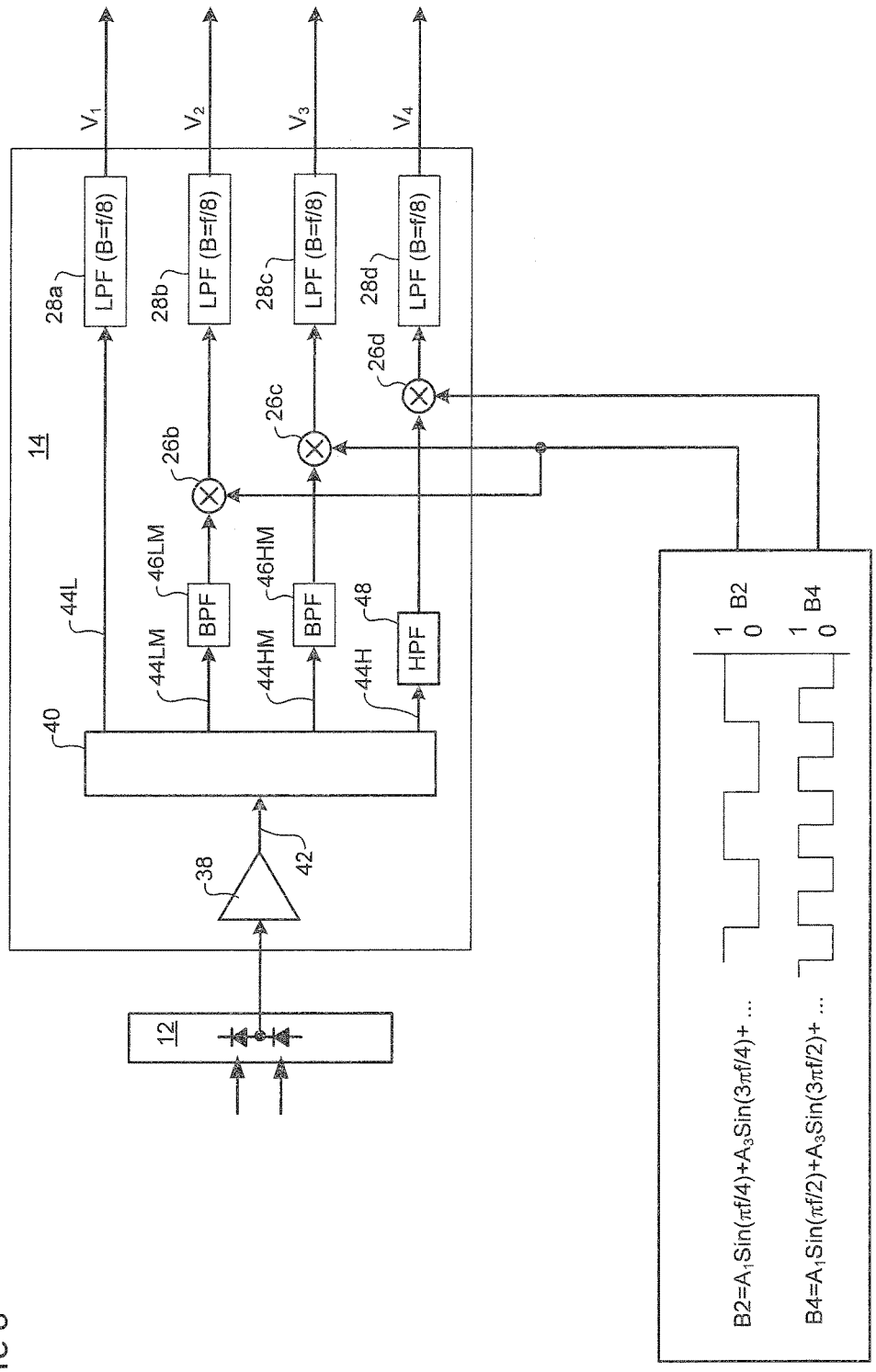
FIG. 8 is a block diagram schematically illustrating operation of a frequency decimation block having four output channels.

Referring to FIG. 8, there is shown a frequency decimation block 14 which includes a frequency domain divider 40 configured to divide the input signal 42 to produce a set of four predetermined frequency band signals. FIGS. 9A-6E illustrate an embodiment in which the spectrum of the analog signal V spans a frequency range between −f/2 and +f/2. As may be seen in FIG. 9A, and the frequency-domain divider 40 operates to generate a low frequency band signal 44L encompassing frequencies lying below +f/8 as may be seen in FIG. 9B; a low-mid-frequency band signal 44LM encompassing frequencies between f/8 and f/4 as may be seen in FIG. 9C; a high-mid-frequency band signal 44HM encompassing frequencies between f/4 and 3f/8 as may be seen in FIG. 9D and a high frequency band signal 44H encompassing frequencies lying above 3f/8 as may be seen in FIG. 6E. Other frequency ranges may be used, if desired.

Figure 9:
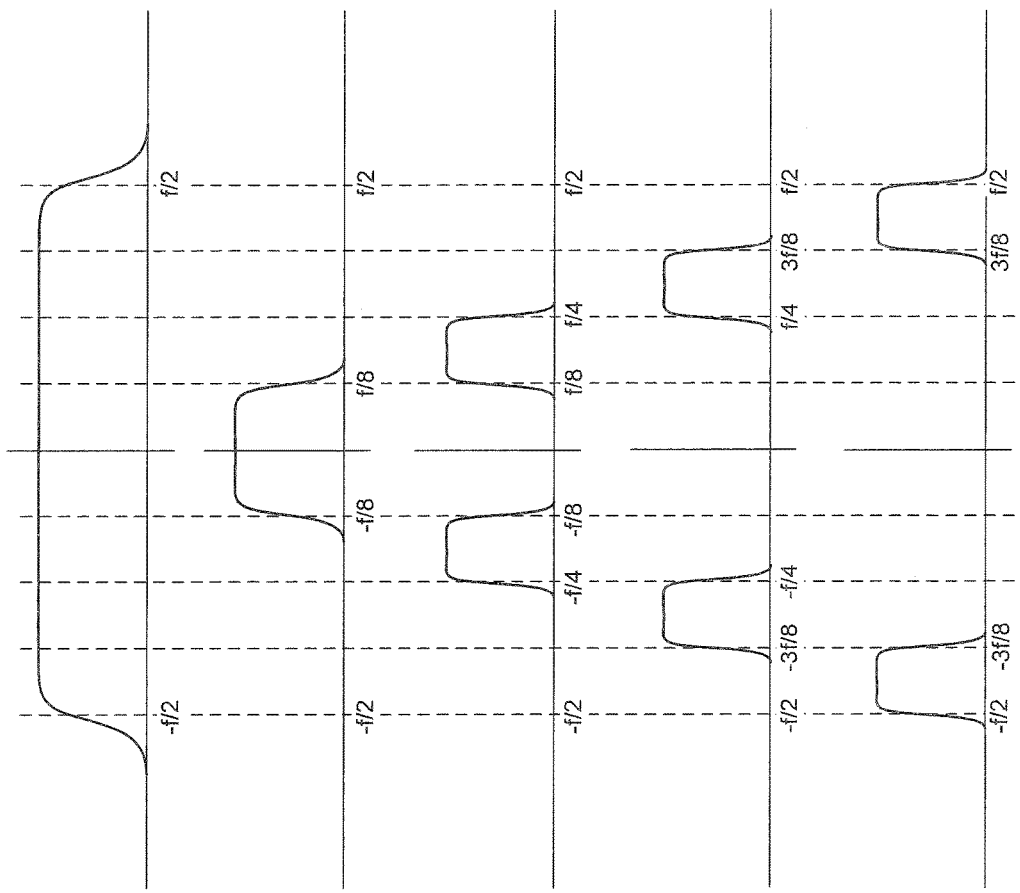
FIGS. 9A-9E are spectral diagrams illustrating operation of the frequency decimation block of FIG. 8.

In the embodiments of FIGS. 8 and 9, the low frequency band signal 44L is a baseband signal. This implies that a nonlinear processor 26a (FIG. 1B) in the low frequency band signal path would receive a DC branch signal B1, which has no effect and thus can be omitted. Low-pass filtering the low frequency band signal 44L (at 28a) yields a low-frequency analog signal V1 which can be sampled by A/D converter 20a and processed by the DSP 22 to recover low-frequency components of the photodetector signal V. The two mid-frequency band signals 44LM and 44HM are supplied to bandpass filters 46LM and 46HM having pass bands at [f/8 ... f/4] and [f/4 ... 3f/8], respectively, and the corresponding filtered signals are supplied to non-linear processors 26b and 26c and mixed with a branch signal B2 having a frequency of f/4. Low pass filtering (at 28b and 28c) the composite signals output from the non-linear processors 26b and 26c yields low-frequency analog signals V2 and V3 which can be sampled by respective A/D converters 20b and 20c and processed by the DSP 22 to recover corresponding frequency components of the photodetector signal V. Finally, the high-frequency band signal 44H is supplied to a non-linear processor 26d which is also supplied with a respective high-frequency branch signal B4 (having a frequency of f/2 in the illustrated example). Low pass filtering (at 28d) the output of the non-linear processor 26d yields a low frequency analog signal V4 which can be sampled by A/D converters 20d and processed by the DSP 22 to recover high-frequency components of the photodetector signal V.

Figure 10:
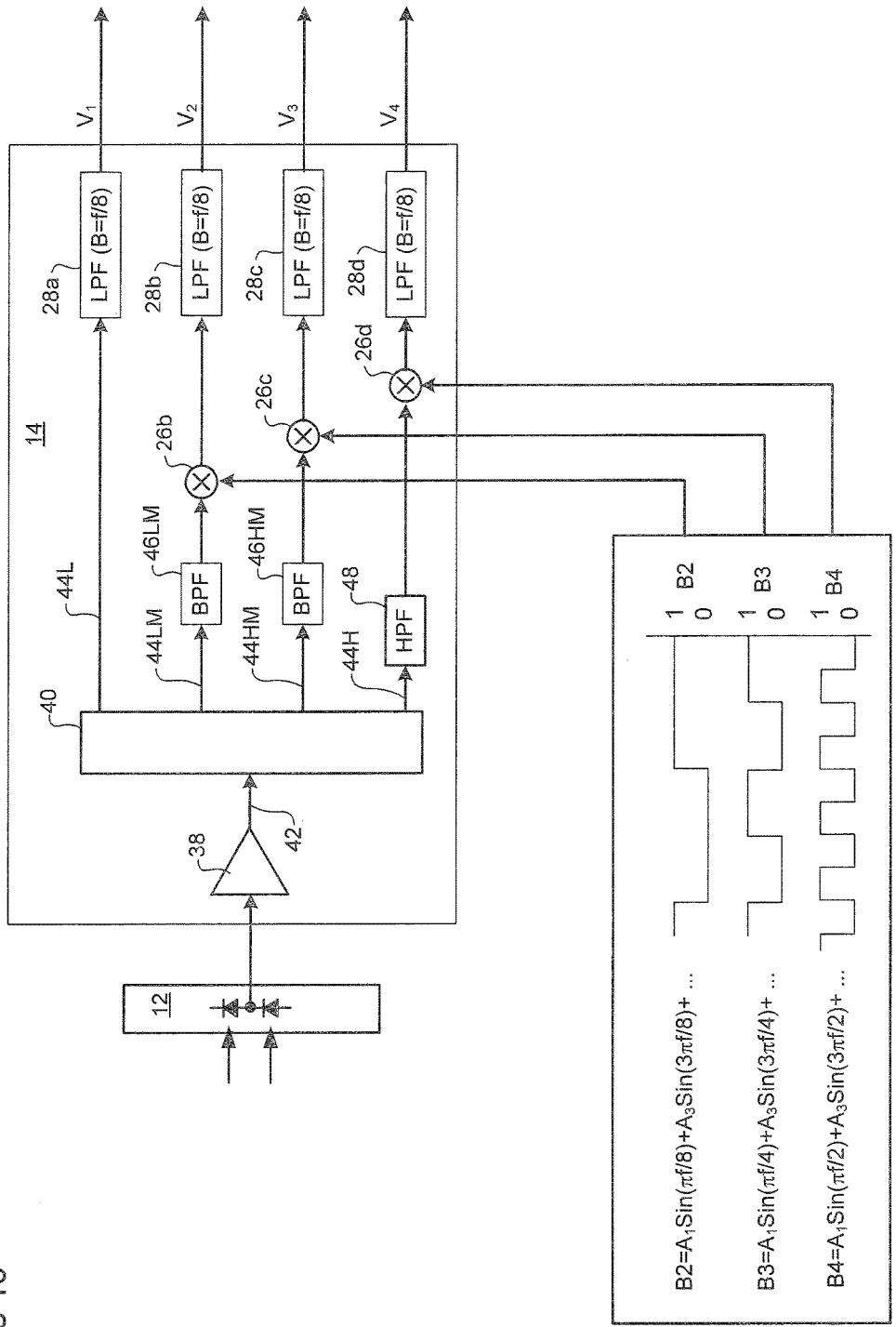
FIG. 10 is a block diagram schematically illustrating operation of a frequency decimation block having four output channels.

FIG. 10 illustrates a further alternate embodiment of the frequency decimation block 14. The embodiment f FIG. 10 is closely similar to that of FIG. 8, except that the non-linear processors 26b and 26c are supplied with different branch signals B2 and B3 having frequencies f/8 and f/4 respectively.

A technique for digitally recombining the analog signals V1-V4 produced by the embodiment of FIG. 8 is shown in FIGS. 11A-11D. As in the embodiments discussed above, each analog signal is sampled by a respective A/D converter 20 and then processed by a respective FT block 32. The output taps of each FFT block are then combined by a summation block 34 to construct a digital spectrum that closely approximates the spectrum of the photodetector current V. For ease of illustration, the construction of the low-frequency, low-mid-frequency, high-mid-frequency and high-frequency components of the combined sign (VF) are illustrated separately.

Figure 11A:
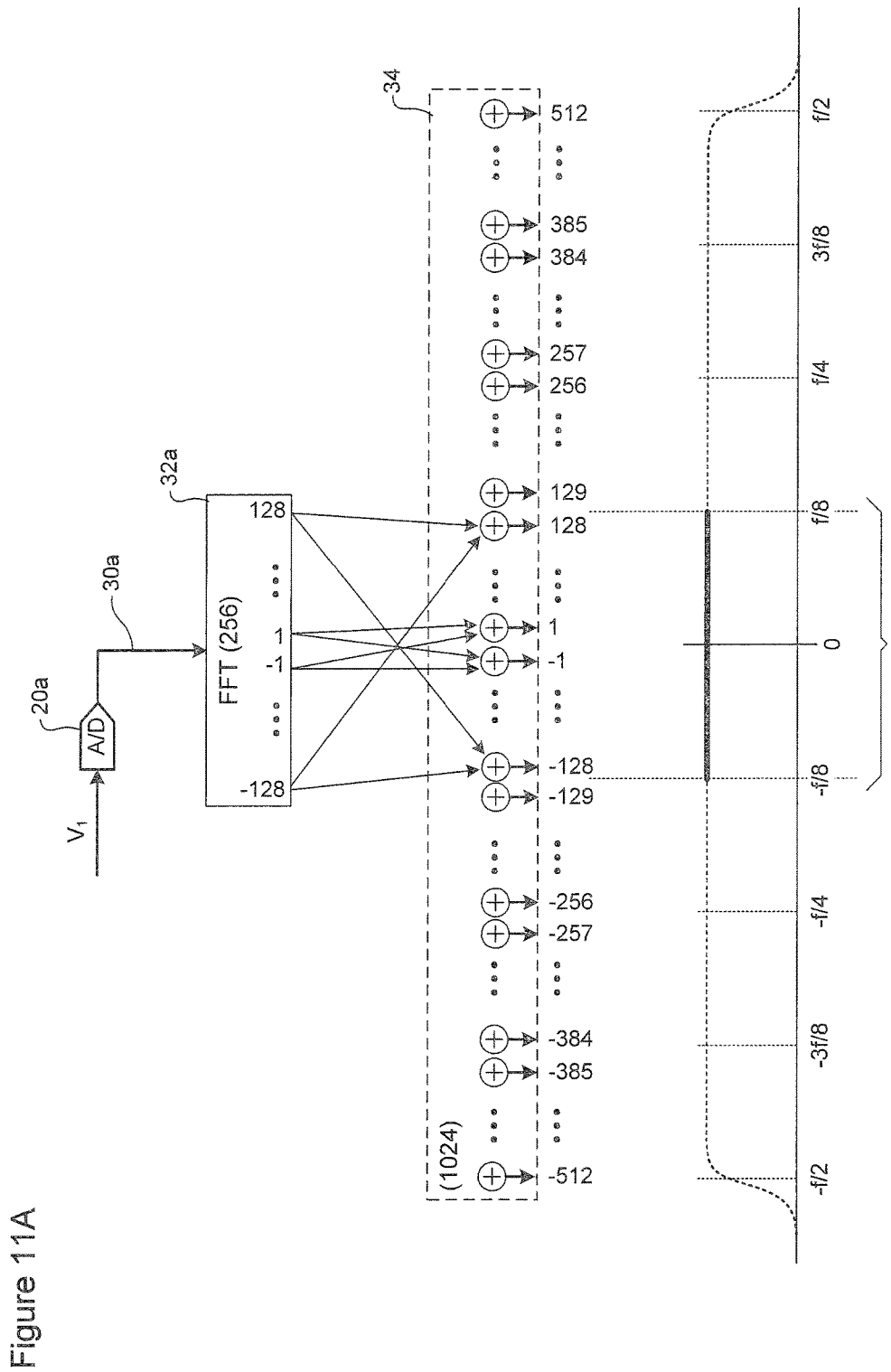
FIGS. 11A-11D are block diagrams schematically illustrating operation of a frequency domain signal combiner usable in conjunction with the frequency decimation blocks of FIGS. 8 and 10.

FIG. 11A illustrates construction of the low-frequency components of the combined sign (VF). As may be seen in FIG. 10A, the low frequency analog signal V1 is sampled by A/D converter 20a, and the corresponding sample steam 30a is processed by a Fast Fourier Transform (FFT) block 32a. The FFT block 32a has a width of 256 taps, which, for convenience, are labelled as −128 ... −1, 1 ... 128. This labelling convention is useful in that the spectrum of the analog signal V1 is centered on 0 Hz (as shown in FIG. 6B) so that taps 1 ... 128 of FFT block 32a will correspond with positive frequency components of the input signal V1, and taps −1 ... −128 will correspond with negative frequency components of the input signal V1 (or, equivalently, the conjugate of taps 1 ... 128). With this arrangement, the sample stream 30a can be combined in the center 256 taps of the 1024-tap summation block 34 to construct the low-frequency components of a digital spectrum that closely approximates that of the photodetector current V.

Figure 11B:
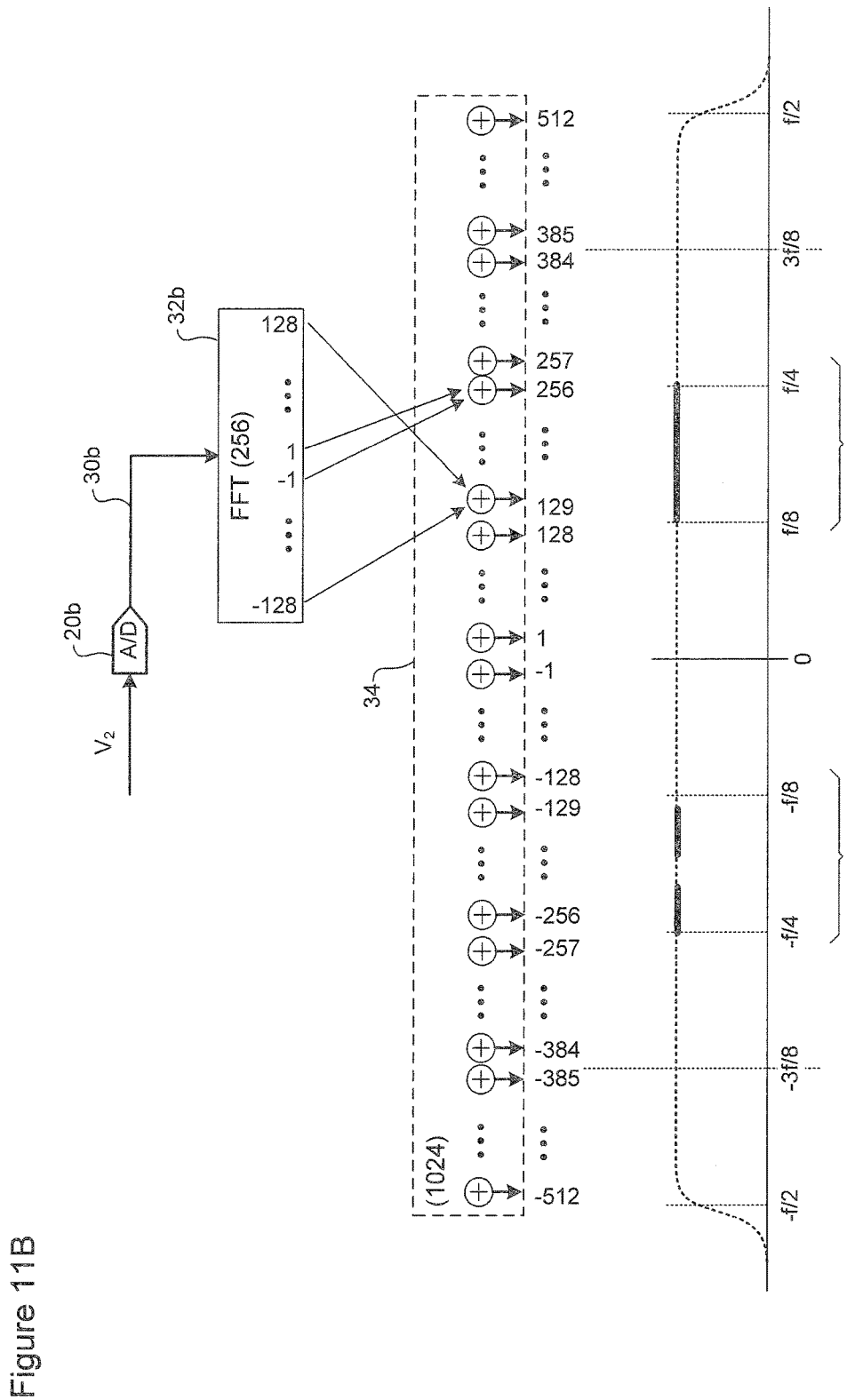

For the positive frequency components, each tap (i) of the combined signal (VF) is constructed as follows:

For frequency components from 0 to f/8: VF(i)=V1(i)+V1(−i) i=1 ... 128,

The negative frequency components are constructed in a corresponding manner. Thus, each tap (i) of the combined signal (VF) is constructed as follows:

For frequency components from 0 to −f/8: VF(i)=V1(i)+V1(−i) i=−1 . . . −128,

FIG. 11B illustrates construction of the low-mid-frequency components of the combined sign (VF). As may be seen in FIG. 10B, the Low-mid frequency band analog signal V2 is sampled by a respective A/D converter 20b, and the corresponding sample steam 30b processed by a Fast Fourier Transform (FFT) block 32b. The FFT block 32b has a width of 256 taps, which, for convenience, are labelled as −128 . . . −1, 1 . . . 128. This labelling convention is useful in that the spectrum of the analog signal V1 is centered on 0 Hz so that taps 1 . . . 128 of each FFT block 32 will correspond with positive frequency components of the input signal V2, and taps −1 . . . −128 will correspond with negative frequency components of the input signal V2 (or, equivalently, the conjugate of taps 1 . . . 128). With this arrangement, the sample stream 30b can be combined using 1024-tap summation block 34 to construct the low-mid-frequency band components of a digital spectrum that closely approximates that of the photodetector current V. With this arrangement, frequencies −f/4, −f/8, f/8 and f/4 of the combined signal VF are bracketed by taps −257, −256; −129, −128; 128, 129; and 256, 257, respectively, of the summation block 34.

Figure 11C:
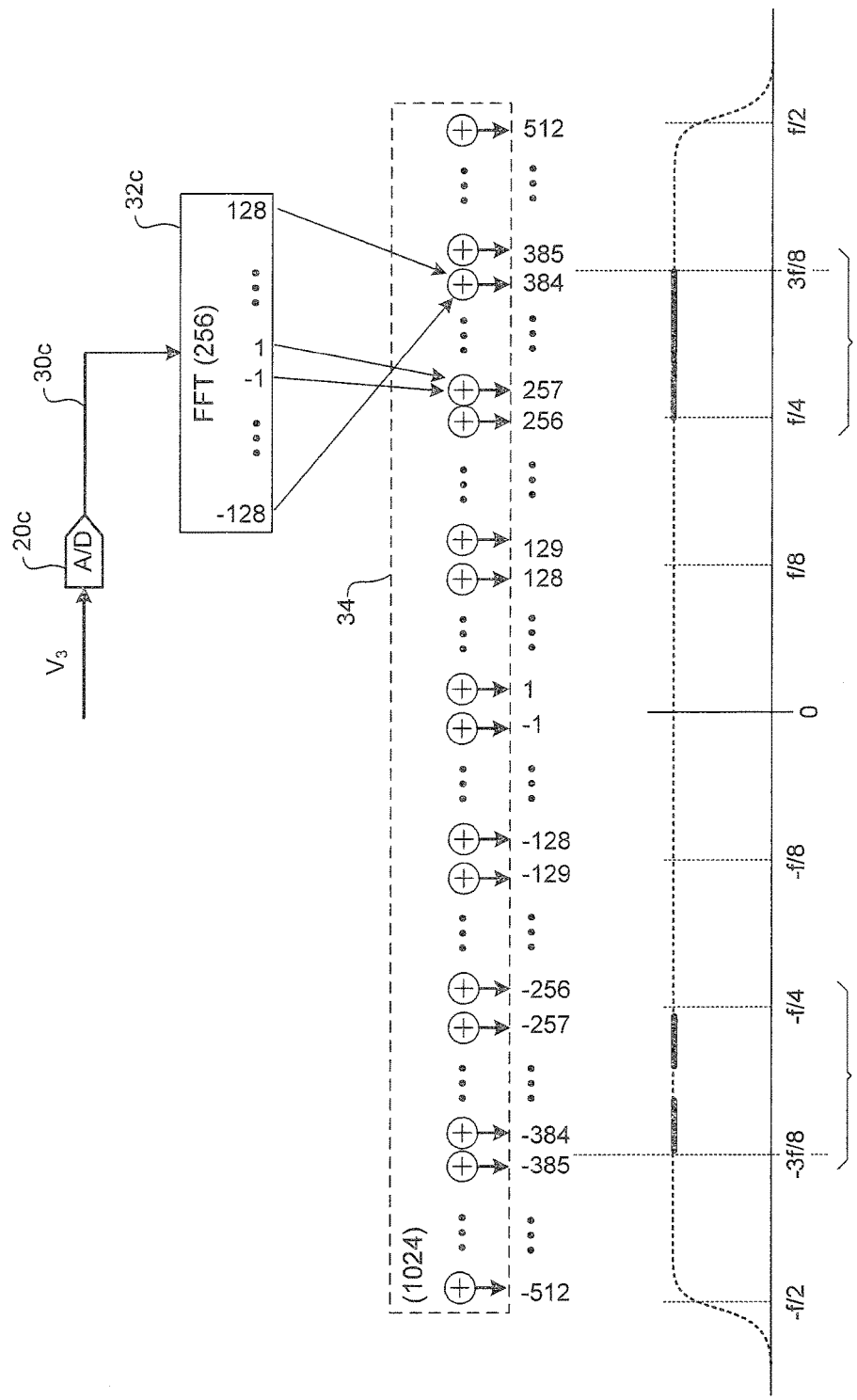

For the positive frequency components, each tap (i) of the combined signal (VF) is constructed as follows:

For frequency components from f/8 to f/4: VF(257−i)=V1(i)+V1(−i) i=1 . . . 128,

The negative frequency components are constructed in a corresponding manner. Thus, each tap (i) of the combined signal (VF) is constructed as follows:

For frequency components from −f/8 to −f/4: VF(−257+i)=V1(i)+V1(−i) i=1 . . . 128, FIG. 11C illustrates construction of the high-mid-frequency components of the combined sign (VF). As may be seen in FIG. 11C, the high-mid frequency band analog signal V2 is sampled by a respective A/D converter 20c, and the corresponding sample steam 30c processed by a Fast Fourier Transform (FFT) block 32c. The FFT block 32c has a width of 256 taps, which, for convenience, are labelled as −128 . . . −1, 1 . . . 128. This labelling convention is useful in that the spectrum of the analog signal V1 is centered on 0 Hz so that taps 1 . . . 128 of each FFT block 32c will correspond with positive frequency components of the input signal V3, and taps −1 . . . −128 will correspond with negative frequency components of the input signal V3 (or, equivalently, the conjugate of taps 1 . . . 128). With this arrangement, the sample stream 30c can be combined using 1024-tap summation block 34 to construct the low-mid-frequency band components of a digital spectrum that closely approximates that of the photodetector current V. With this arrangement, frequencies −3f/8, f/4, f/4 and 3f/8 of the combined signal are bracketed by taps −385, −384; −257, −256; 256, 257; and 384,385, respectively, of the summation block 34.

Figure 11D:
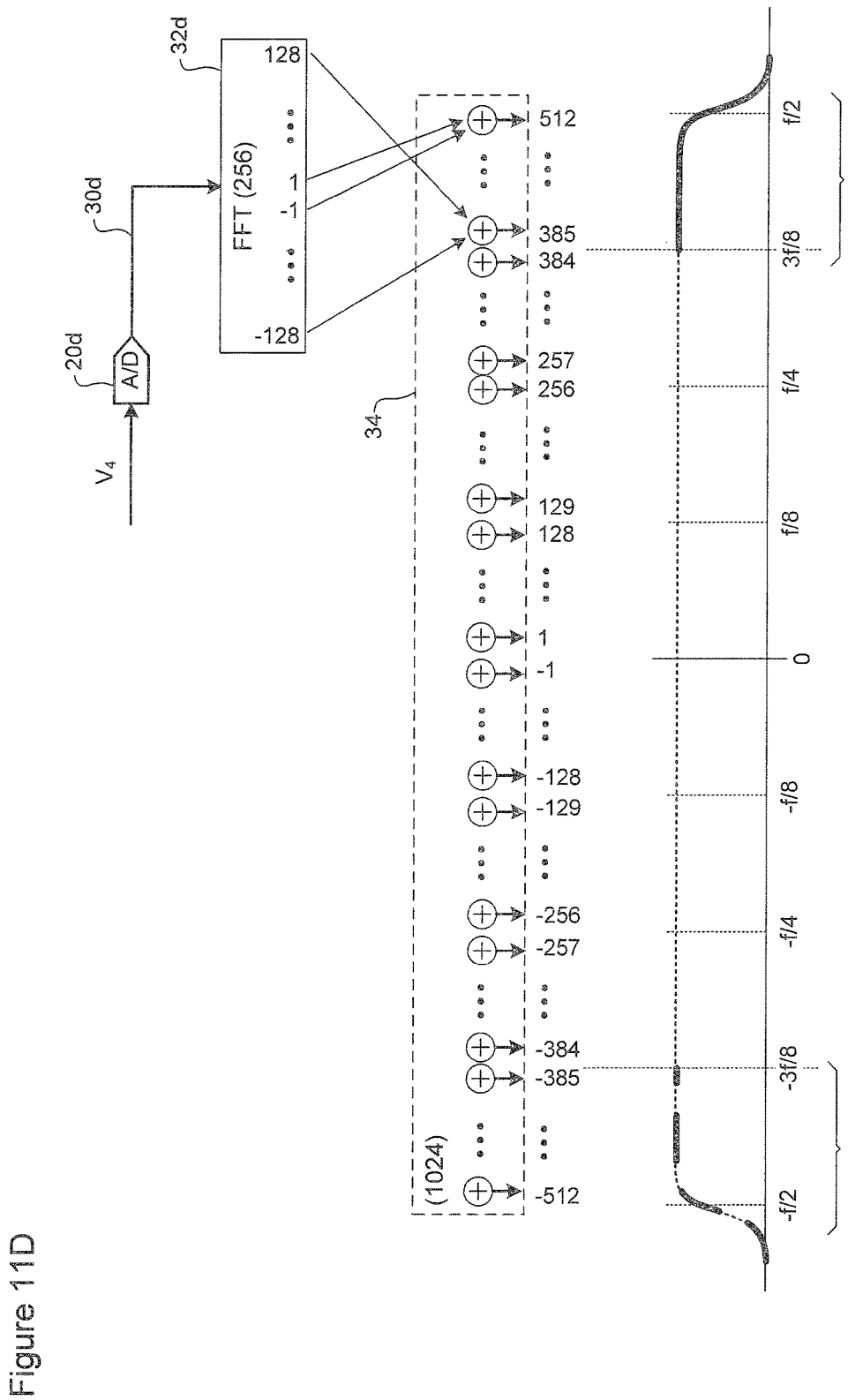

For the positive frequency components, each tap (i) of the combined signal (VF) is constructed as follows:

For frequency components from f/4 to 3f/8: VF(256+i)=V1(i)+V1(−i) i=1 . . . 128, The negative frequency components are constructed in a corresponding manner. Thus, each tap (i) of the combined signal (VF) is constructed as follows:

For frequency components from −f/4 to −3f/8: VF(−256−i)=V1(i)+V1(−i) i=1 . . . 128, FIG. 11D illustrates construction of the high-frequency components of the combined sign (VF). As may be seen in FIG. 11D, the high frequency analog signal V4 is sampled by A/D converter 20d, and the corresponding sample steam 30d is processed by a Fast Fourier Transform (FFT) block 32d. The FFT block 32d has a width of 256 taps, which, for convenience, are labelled as −128 . . . −1, 1 . . . 128. This labelling convention is useful in that the spectrum of the analog signal V4 is centered on 0 Hz so that taps 1 . . . 128 of FFT block 32d will correspond with positive frequency components of the input signal V4, and taps −1 . . . −128 will correspond with negative frequency components of the input signal V4 (or, equivalently, the conjugate of taps 1 . . . 128). With this arrangement, the sample stream 30d can be combined in the upper-most and lower-most 128 taps of the 1024-tap summation block 34 to construct the high-frequency components of a digital spectrum that closely approximates that of the photodetector current V.

For the positive frequency components, each tap (i) of the combined signal (VF) is constructed as follows:

For frequency components from 3f/8 to f/2: VF(513−i)=V1(i)+V1(−i) i=1 . . . 128, The negative frequency components are constructed in a corresponding manner. Thus, each tap (i) of the combined signal (VF) is constructed as follows:

For frequency components from −3f/8 to −f/2: VF(−513+i)=V1(i)+V1(−i) i=1 . . . 128.

As may be appreciated, the analog signals V1-V4 produced by the embodiment of FIG. 10 can be digitally recombined using the summation block 34 to construct the frequency components of the combined signals VF. The specific mappings between each FFT block 32 and the taps of the summation block 34 will be apparent to those of ordinary skill in the art, based on the foregoing descriptions, and so will not be described in greater detail herein.

In the embodiments described above, the parallel sample streams 30 are combined using an summation block 34 having 1024 taps. Clearly, thus use of 1024 taps is not essential. The summation block 34 may have any desired width, consistent with the bandwidth of the photodetector signal V and the sample rates of the A/D converters 20. Similarly, the width of the FFT blocks 32 will normally be selected based on the width of the summation block 34, and the number of parallel analog signals Vx being used to construct the spectrum of the combined signal (VF). Thus, in the embodiment of FIGS. 2-4, two parallel analog signals Vx are used to construct the spectrum of the combined signal (VF), so each FFT block 32 has a width one-half that of the summation block 34. Similarly, in the embodiment of FIGS. 5-7, four parallel analog signals Vx are used to construct the spectrum of the combined signal (VF), so each FFT block 32 has a width one-fourth that of the summation block 34.

In the embodiments described above, the parallel sample streams 30 are processed using Fast Fourier Transform blocks 32. However, the calculation of a Fast Fourier Transform is not essential. As is known in the art, the Fast Fourier Transform is an efficient algorithm for computing a Discrete Fourier Transform (DFT). Any suitable method of calculating the spectrum of each sample stream 30 may be used.

Since real Low Pass Filters do not have a perfect (brick-wall) cut-off characteristic, each parallel analog signal Vx will contain interference (aliasing) and noise terms from adjacent frequency bands. For example, in FIG. 6, the spectrum of the low-frequency band signal extends beyond ±f/8; which will appear as aliasing and noise near the cut-off frequency of the mid-frequency band signal, and conversely, the portion of the mid-frequency band spectrum extending beyond ±f/8 will appear as aliasing and noise near the cut-off of the low-frequency band signal spectrum. Similarly, the spectra of the mid-frequency band and high frequency band signals will interfere with each other and produce aliasing noise around the cut-off frequency of ±3f/8.

One method of reducing aliasing noise near the cut-off frequency of each analog signal Vx is to apply a joint linear or non-linear function of taps of adjacent FFT blocks 32 (either in the overlap region of frequency or in the region of frequency which is close to the boundary frequency between two A/D converters 20) in order to reduce either the power of interference and aliasing or the power of noise. For example, in the embodiment of FIGS. 5-7, terms of the combined signal VF around ±f/8 can be generated using maximum ratio combining of output taps of FFT blocks 32a-32c instead of the linear summations shown in FIGS. 7A and 7B. The number of terms of the combined signal VF generated using maximum ratio combining may be selected using any suitable criteria, which will be apparent to those or ordinary skill in the art. In some embodiments, the joint linear or non-linear function may be implemented using a multi-dimensional Minimum Mean Square Error (MMSE) Wiener filter in order to maximize the Signal to Interference and Noise Ratio (SINR). In fact, the aliasing terms in one frequency band signal correspond to signal terms in the adjacent frequency band signal. A multi-dimensional Wiener filter can be used to exploit this property and so improve SINR significantly.

If desired, maximum ratio combining may be used alone or in combination with over-sampling of the ADCs. More particularly, Nyquist sampling of each analog signal Vx requires that each A/D converter 20 be driven at a sample rate approximately double that of the analog signal bandwidth. For the example of FIGS. 5-7, this implies a sample rate of f/4. Over-sampling the analog signal Vx implies driving the A/D converter 20 at a higher sample rate (such as, for example 8/7*f/4). Over-sampling the analog signal Vx in this manner causes the upper-most and lower-most output taps of each FFT block 32 to contain frequency terms lying outside the cut-off frequency of the corresponding LPF 28, which provides additional information which can be used to improve the maximum ratio combining technique. This approach may also reduce the number of terms of the combined signal VF that need to be generated using maximum ratio combining in order to obtain an acceptable SNIR.

In the foregoing embodiments, a photodetector signal V is generated by a photodetector 12 based on a received optical channel light λn. The photodetector signal V is then processed by the frequency decimator 14 to generate parallel analog signals V1-V4. These analog signals are then sampled and recombined by a DSP 22 to construct a digital signal having a spectrum that corresponds with that of the photodetector signal V, at least closely enough to enable recovery of data modulated on the photodetector signal V. These embodiments are particularly adapted for use in an optical communications system. However, it will be appreciated that the photodetector signal V can be replaced by any high bandwidth analog signal produced by any desired means. Thus the present invention is not limited to optical communications systems.

The embodiments of the invention described above are intended to be illustrative only. The scope of the invention is therefore intended to be limited solely by the scope of the appended claims.

We claim:

1. A receiver of an optical communications system, the receiver comprising:
   a set of two or more analog-to digital (A/D) converters, each A/D converter configured to sample a respective low-bandwidth analog signal comprising a respective portion of a high-bandwidth data signal;
   a respective transform block connected to an output of each A/D converter, each transform block configured to calculate a set of spectral components of the respective low-bandwidth analog signal; and
   a summation block configured to combine respective spectral components calculated by each transform block to construct spectral terms of a combined signal having a spectrum corresponding to that of the high-bandwidth data signal.

2. The receiver as claimed in claim 1, wherein each transform block is configured to compute any one of:
   a Discrete Fourier Transform and
   a Fast Fourier Transform.

3. The receiver as claimed in claim 1, wherein the set of parallel low-bandwidth signals comprises;
   a low frequency-band signal comprising frequency components of the high-bandwidth data signal lying below a first cut-off frequency;
   at least one mid-frequency band signal comprising frequency components of the high-bandwidth data signal lying above the first cut-off frequency and below a second cut-off frequency; and
   a high-frequency band signal comprising frequency components of the high-bandwidth data signal lying above the second cut-off frequency.

4. The receiver as claimed in claim 3, wherein the summation block comprises a respective adder for each spectral term of the combined signal, the adder configured to digitally add two spectral components calculated by at least one of the transform blocks.

5. The receiver as claimed in claim 3, wherein the summation block comprises:
   a respective adder for each one of a first subset of spectral terms of the combined signal, the adder configured to digitally add two spectral components calculated by at least one of the transform blocks; and
   a maximum ratio combiner configured to a second subset of spectral terms of the combined signal based on spectral components calculated by two of the transform blocks.

6. The receiver as claimed in claim 5, wherein the second subset of spectral terms lie proximal the first and second cut-off frequencies.

7. A method of combining parallel signal paths in a receiver of an optical communications system, the method comprising:
   sampling, by each one of a set of two or more analog-to digital (A/D) converters, a respective low-bandwidth analog signal comprising a respective portion of a high-bandwidth data signal;
   calculating, by a respective transform block connected to an output of each A/D converter, a respective set of spectral components of each low-bandwidth analog signal, the based on samples generated by a corresponding one of the A/D converters; and
   combining respective spectral components of each low-bandwidth analog signal to construct spectral terms of a combined signal having a spectrum corresponding to that of the high-bandwidth data signal.

8. The method as claimed in claim 7, wherein calculating a respective set of spectral components of each low-bandwidth analog signal comprises calculating either one of:
   a Discrete Fourier Transform of each low-bandwidth analog signal; and a Fast Fourier Transform of each low-bandwidth analog signal.

9. The method as claimed in claim 7, wherein the set of parallel low-bandwidth signals comprises;
   a low frequency-band signal comprising frequency components of the high-bandwidth data signal lying below a first cut-off frequency;
   at least one mid-frequency band signal comprising frequency components of the high-bandwidth data signal lying above the first cut-off frequency and below a second cut-off frequency; and
   a high-frequency band signal comprising frequency components of the high-bandwidth data signal lying above the second cut-off frequency.

10. The method as claimed in claim 9, wherein combining respective spectral components of each low-bandwidth analog signal comprises digitally adding two spectral components calculated by at least one of the transform blocks.

11. The method as claimed in claim 9, wherein combining respective spectral components of each low-bandwidth analog signal comprises:
   digitally adding two spectral components calculated by at least one of the transform blocks; and
   generating a second subset of spectral terms of the combined signal based on spectral components calculated by two of the transform blocks.

12. The method as claimed in claim 11, wherein the second subset of spectral terms lie proximal the first and second cut-off frequencies.

* * * * *